United States Patent [19]

Paradis

[11] Patent Number: 4,548,242

[45] Date of Patent: * Oct. 22, 1985

[54] INSTALLATION TOOL

[75] Inventor: Joseph R. Paradis, Holden, Mass.

[73] Assignee: Dennison Manufacturing Company, Framingham, Mass.

[ * ] Notice: The portion of the term of this patent subsequent to Apr. 24, 1996 has been disclaimed.

[21] Appl. No.: 11,725

[22] Filed: Feb. 12, 1979

Related U.S. Application Data

[62] Division of Ser. No. 935,207, Aug. 21, 1978, now Re. 29,973.

[51] Int. Cl.⁴ .............................................. B21F 9/02
[52] U.S. Cl. ................................. 140/123.6; 140/93.2
[58] Field of Search .................. 140/123.6, 93.2, 93 A

[56] References Cited

U.S. PATENT DOCUMENTS

| | | | |
|---|---|---|---|
| Re. 29,973 | 4/1979 | Paradis | 140/123.6 |
| 3,154,114 | 10/1964 | Bailey | 140/123.6 |
| 3,433,275 | 3/1969 | Eppler | 140/93.2 |
| 3,589,406 | 6/1971 | Moberg | 140/93 A |
| 3,661,187 | 5/1972 | Caveney et al. | 140/123.6 |
| 3,746,055 | 7/1973 | Farkas et al. | 140/123.6 |
| 3,810,499 | 5/1974 | Benfer | 140/93.2 |
| 3,865,156 | 2/1975 | Moody et al. | 140/123.6 |
| 4,047,545 | 9/1977 | Paradis | 140/123.6 |

*Primary Examiner*—Daniel C. Crane
*Attorney, Agent, or Firm*—George E. Kersey

[57] ABSTRACT

A tool that is particularly suitable for the installation of objects that require tensioning and severing. A tensioning member is operated through a toggle linkage that collapses when a pre-determined level of tensioning is reached and actuates a cutoff lever. The result is severance of the tensioned object with reduced shock loading. In addition the tool is easy to operate; the tensioning level is accurately and reliably adjustable; and the severed object is controllably ejected from the tool.

5 Claims, 9 Drawing Figures

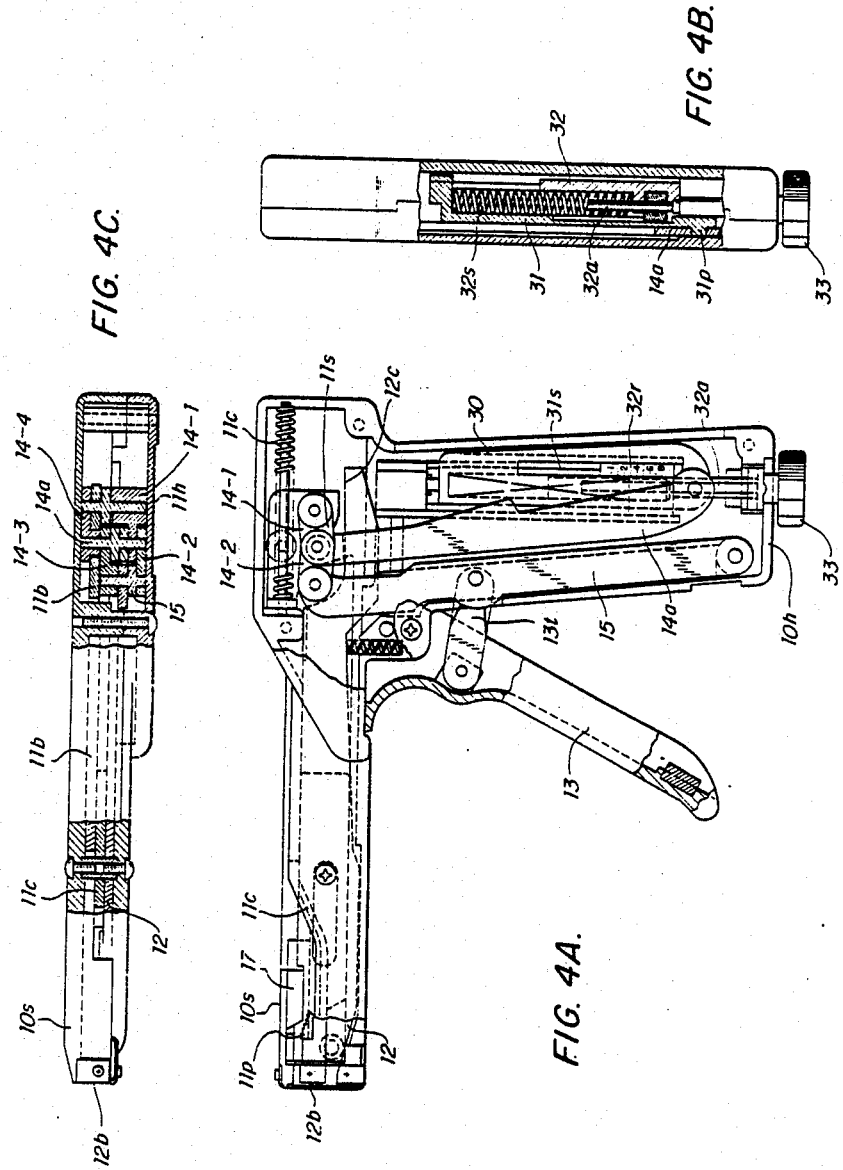

INSTALLATION TOOL

This application is a division of Ser. No. 935,207, filed Aug. 21, 1978, now U.S. Pat. No. Re. 29,973, issued Apr. 24, 1979.

BACKGROUND OF THE INVENTION

This invention relates to a tool for the installation of items that require tensioning and more particularly to a tool for the installation of fasteners such as cable ties.

Cable tie fasteners are commonly installed, for example, by wrapping their straps around groups of articles and then threading the straps through locking heads. The installation is completed by pulling on the free ends of the straps until the articles are securely bundled. To achieve a suitable installation it is desirable to use a tool which grips and tensions the free end of the strap. The free end is then severed in the vicinity of the head when a specified level of tensioning has been reached.

Installation tools in common use contain a trigger actuated mechanism that tensions the strap to a predetermined level and actuates a cutter to sever the strap.

Such tools commonly require the application of a relatively high operating force to the trigger through an appreciable interval. In some cases there is a considerable span between the hand grip of the gun and the trigger. The result is that the tools can be difficult to operate and can cause undue user fatigue.

Another characteristic of existing installation tools is that the cutoff mechanism produces a significant shock effect. At the instant of severing there is pronounced snap which, at high tension levels, can even sting the user. In addition there is the objectionable tendency for the severed end of the strap to be ejected from the tool towards the user. Another objection is the tension level adjusting mechanism is often unreliable and difficult to operate.

Accordingly, it is an object of the invention to reduce the shock effect associated with the severing of items under tension. A related object is to reduce the shock effect associated with the severing of tensioned fasteners. A further related object is to reduce the shock effect associated with the severing of tensioned cable tie straps.

Another object of the invention is to achieve an installation tool in which an item may be tensioned and severed using a reduced amount of trigger force. A related object is to achieve the tensioning and severing of an item using a trigger which has a comparatively short operating span.

A further object of the invention is to provide an accurate and easily adjustable tensioning level for an installation tool.

Still another object is to avoid the objectionable tendency of items that are severed under tension to fly back and strike the operator.

Illustrative installation tools of the prior art are disclosed in U.S. Pat. Nos. 3,735,784; 3,712,346; 3,661,187; 3,433,275; 3,344,815; 3,332,454; 3,284,076; 3,173,456; 3,169,560 (Re. 26,492); 3,168,119; 3,154,114; 2,729,994; 2,882,934; and 2,175,478.

SUMMARY OF THE INVENTION

In accomplishing the foregoing and related objects the invention provides an installation tool in which a tensioning assemblage is driven through an intervening toggle linkage that is able to actuate a sever mechanism. The intervening linkage is prevented from collapsing until a certain level of tensioning is attained by the application of a countervailing force.

In accordance with one aspect of the invention the toggle linkage is drawn through an internally pivoted actuator lever to reduce the amount of operator applied force.

In accordance with another aspect of the invention the countervailing tension is applied by a compression cage.

In accordance with a further aspect of the invention the tool uses an ejector spring to propel severed items away from the user.

DESCRIPTION OF THE DRAWINGS

Other aspects of the invention will become apparent after considering various illustrative embodiments, taken in conjunction with the drawings in which

FIG. 4A is a view of the installation tool of FIG. 1 with portions broken away to show the placement of constituents pictured in FIGS. 2A through 3B;

FIG. 4B is an end view of the tool of FIG. 4A, and

FIG. 4C is a top view of the tool of FIG. 4A.

DETAILED DESCRIPTION

Figure 1:
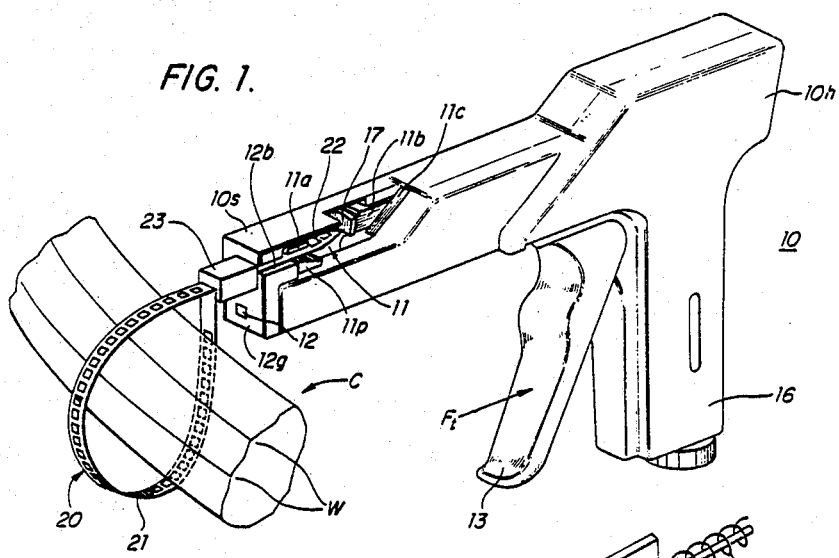
FIG. 1 is a perspective view of a tool in accordance with the invention being used in the installation of a cable tie.

Turning to the drawings, an installation tool 10 in accordance with the invention is formed by a split-cover housing 10h containing a tensioning assemblage 11 and a pivoted cutoff lever 12, which is visible through a viewing aperture of a cutter guard 10g and mounts a cutter blade 12b.

As illustrated in FIG. 1, the tool 10 can be used to complete the installation of an item such as a cable tie 20. The strap portion 21 of the tie 20 is wrapped around articles that are to be bundled, for example the individual wires W of a cable C. A free end 22 of the tie 20 is inserted through the head 23 of the strap into the mouth of the tool 10 between gripper constituents lip and 11a of the tensioning assemblage 11.

When force $F_t$ is applied to a trigger 13 of the tool 10, it is transmitted through levers and linkages (not visible in FIG. 1) to the tensioning assemblage 11, causing the assemblage to be drawn towards the rear of the gun. This frees a pivotted and spring-loaded pawl 11p which rotates against the portion 22 of the strap and grips it with respect to a stud 11a.

The initial rearward motion of the tensioning assemblage 11 caused by the force Ft tightens the portion 21 of the strap around the wires W of the cable C, with the head 23 of the cable tie 20 in close abutment with the tool 10. Further movement of the tensioning assemblage 11 increases the tension applied to the gripped portion 22 of the tie 20 until a predetermined tension level is reached. At that point, as explained below, the force transmitted to the tensioning assemblage 11 from the trigger 13 causes a collapse of the intervening linkage which acts upon the cutoff lever 12 and pivots it upwardly, bringing the blade 12b into sever position with respect to the gripped end portion 22 of the cable tie 20.

In the typical operation of an installation tool the sever action produces a significant shock impact. However, in accordance with the invention this impact is significantly reduced because of the particular way in which the cutoff lever 12 is operated, as explained in conjunction with FIGS. 2A through 2C.

Figure 2A:
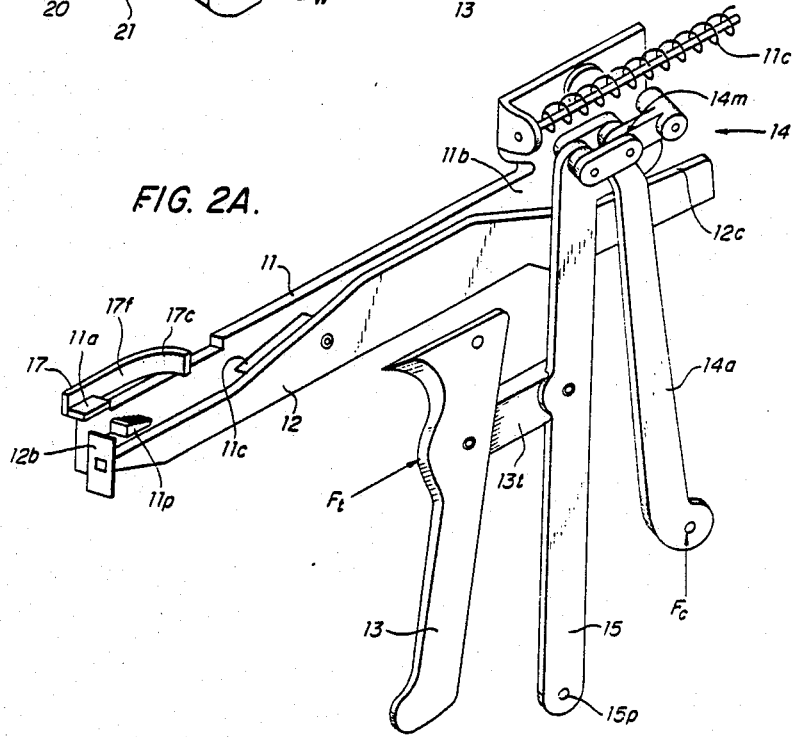
FIG. 2A is a perspective view of the tensioning and sever mechanisms in the installation tool of FIG. 1.

A perspective view showing the relationship between the tensioning assemblage 11 and the cutoff lever 12 is given in FIG. 2A. The tensioning assemblage 11 is maintained in a normally forward position in the tool 10 by a compression spring 11c. The tensioning assemblage is connected to the trigger 13 through a set of actuator linkages including toggle linkages 14 and an internal actuator lever 15.

When the trigger force $F_t$ is applied, it is transmitted through a trigger link $13_t$ to the actuator lever 15 which is pivotally mounted within the handle 16 of the tool 10. The upper portion of the actuator lever 15 is pivotally connected to the toggle linkages 14, which are, in turn, pivotally connected to the bar 11b of the tensioning assemblage 11. To maintain the toggle linkages 14 in position to transmit the trigger force $F_t$, a countervailing force $F_c$ is applied to the midpoint 14m of the toggle through a toggle arm 14a. *When the tensioning force applied from the trigger 13 exceeds the countervailing force $F_c$, the toggle collapses by pivoting with respect to both the actuator lever 15 and the tensioning bar 11b and engages a cam surface 12c of the cutoff lever 12. Since the operation of the cutoff lever takes place while the actuator lever is moving to the rear, there is, in effect, a cushioned impact of the collapsed toggle linkages 14 against the cutoff lever 12. It is believed that this cushioning limits the shock loading that is produced when the strap 22 is severed.

*The toggle is never completely straight; there is always a slight angular inclination, in the rest position, towards the force Fc.

In addition, an ejector spring 17, in the form of a leaf 17f with a curvature 17c extending into the mouth of the tool, is included to reduce any tendency for the severed end of the strap to be propelled toward the user.

As the tensioning bar 11b is drawn towards the rear of the gun 10, the curved portion 17c of the ejector spring 17 tends to be flattened against the adjoining housing wall. When the pawl reaches a cam surface 11c (shown in FIGS. 1 and 2A), with the strap 22 under tension, the cam acts upon the pawl and partially releases it. In addition, as noted in FIG. 1, the housing 10h has a shield 10s that extends at the top of the gun to the vicinity of the ejector spring 17. Consequently when the strap is under tension, with the pawl 11p partially released and the spring 17 partially deflected, and the cutter blade 12b is operated to sever the strap, the severed portion tends to be propelled laterally out of the housing, instead of towards the user. The desired lateral propulsion is promoted by contributions from the shield 10s, the partial pawl release provided by the cam 11c and the ejector spring 17. This is by contrast with the tools of the prior art in which the pawl tends to be fully embedded in the leading portion of the strap at the moment of sever and there is no shield 10s, or ejector spring 17, so that when the strap is severed the accompanying release of tension tends to pivot the severed portion of the strap about the pawl and towards the user.

Figure 2B:
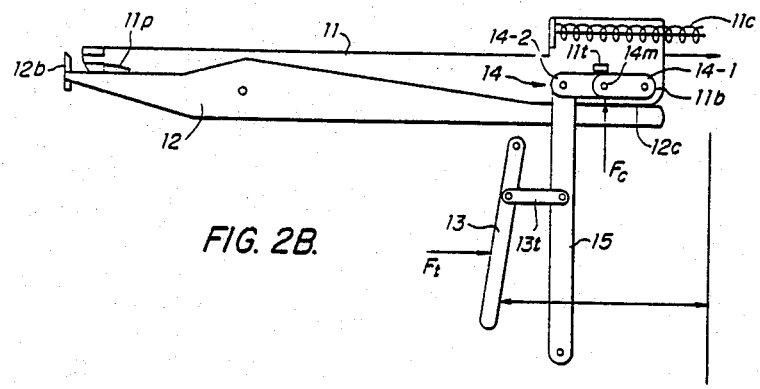
FIG. 2B is a schematic representation of the tensioning and severing mechanisms of FIG. 2A during tensioning.
Figure 2C:
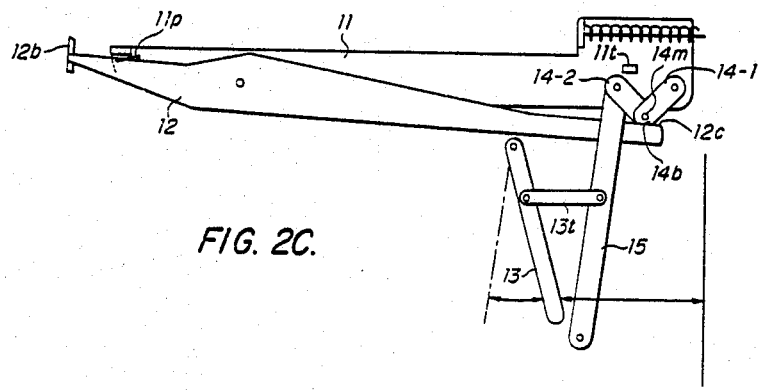
FIG. 2C is a schematic representation of the tensioning and severing mechanism of FIG. 2A during severing.

A schematic representation of the tensioning and sever operation is illustrated in FIGS. 2B and 2C. Initially as shown in FIG. 2B the individual links of the toggle assemblage 14 are in alignment. For simplicity the toggle assemblage 14 in FIG. 2B is formed by the first link 14-1 that is pivotally connected to the tensioning bar 11b and a second link 14-2 that is pivotally connected to the actuator lever 15. The actuator and sever links 14-1 and 14-2 are in turn pivotally joined. It is at this point of joinder 14m that the countervailing force $F_c$ is applied. To keep the countervailing force from driving the links 14-1 and 14-2 of the toggle assemblage out of alignment, the illustrative tensioning bar 11b in FIG. 2B includes an integral stop 11c. For the embodiment of FIG. 2A, the upward motion of the linkages is limited by the use of a slot 11a in the draw bar 11b as shown in FIG. 4A. The various ways of applying the countervailing force $F_c$ to the toggle assemblage 14 are discussed below.

When the tension applied to the strap by the bar 11b exceeds the value of the countervailing force $F_c$ applied at the pivot center 14m of the toggle assemblage 14, that latter collapses as shown in FIG. 2C. This collapse brings a bearing surface 14b of the toggle into engagement with a cam surface 12b at the rear of the cutoff lever 12. Since the toggle assemblage 14 is formed by pivotally connected members, the force transmitted to the cutoff lever is composed of both horizontal and vertical components, by which a cushioned impact is applied to the cutoff lever 12, instead of a direct impact, so that impact shock loading is avoided.

In addition, as is evident from FIG. 2B, the use of the trigger 13 in conjunction with the actuator lever 15 provides a mechanical advantage so that the amount of operator force applied to the toggle is considerably less than that needed with conventional installation tools. The use of the actuator lever 15 also permits the desired tensioning force to be applied over a relatively small arc of operation of the trigger 13.

Figure 3A:
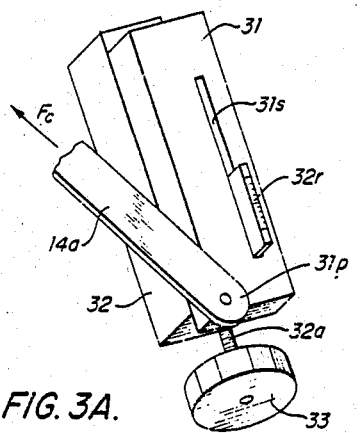
FIG. 3A is a perspective view of a compression spring cage for the adjustment of tension in accordance with the invention.

The countervailing force $F_c$ that is applied to the toggle 14 may be realized in a wide variety of ways. As shown in FIG. 2A the force $F_c$ is applied at the end of the toggle arm 14a. This upward component of countervailing thrust may be achieved by the use of a spring (not shown) which is hooked to the end of the linkage 14a. However, such a spring tends to be mechanically unreliable and in accordance with the invention the desired countervailing force $F_c$ can be realized using a compression spring cage 30 of the kind shown in FIGS. 3A and 3B. As indicated in FIG. 3A the end of the toggle linkage 14a is connected by a pivot pin 31p to an upper part 31 of the cage 30, which is slideably movable with respect to a lower part 32. Since the upper part 31 of the cage 30 applies the desired countervailing force $F_c$ to the toggle arm 14a and is therefore relatively immovable, since the arm initially cannot push the toggle links 14 beyond their co-linear position.

Figure 3B:
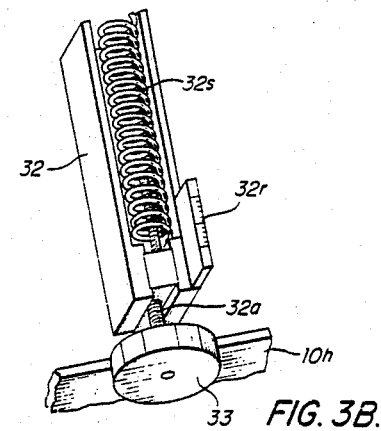
FIG. 3B is a perspective view of the interior of the cage of FIG. 3A.

As noted in conjunction with FIG. 2B the upward movement of the toggle linkage 14 is controlled by a stop member 11c which is an integral part of the tensioning bar 11b. To adjust the tension applied through the toggle arm 14a an adjusting member 32a is threaded into the bottom portion 32 of the cage 30 as shown in FIG. 3B by rotation of a tension control knob 33. This moves the lower portion 32 of the cage 30 of FIG. 3A upwardly with respect to the upper portion 31 and carries with it the indicator 32r that moves within a slot 31s of the upper portion 31 and simultaneously causes compression of the tension control spring 32s. This arrangement achieves precise control over tension and a high degree of mechanical stability.

A partial sectional view of the entire installation tool of FIG. 1 is shown in FIGS. 4A through 4C to indicate the relative positioning of the internal constituents of the tool, as well as the interrelations among those constituents.

Thus in the tool 10 as shown in FIGS. 4A and 4B the toggle assemblage 14 is formed by four linkages (FIG. 4C) 14-1 through 14-4. The link 14-1 is seated on a hub 11h of the tensioning bar 11b. The link 14-1 is in turn pivotally connected to the arm 14a that extends to the compression cage 30. The arm 14a is connected to the lever 15 by a link 14-2, as well as by a further link 14-3. There is also pivotal connection between the hub 11h of the tensioning bar 11b and the arm 14a by a link 14-4. It is the latter link that limits the upward movement of the toggle assemblage due to the application of the compression force $F_c$ through the arm 14a. This is because, as seen in FIG. 4A, the fourth linkage 14-4 rides in a slot 11s of the tensioning bar 11b. Initially with the full compression force $F_c$ applied to the arm 14a the individual links of the toggle assemblage are in alignment and the link 14-4 is seated in the upper part of the recess 11s. When the tension applied to the strap exceeds the countervailing force $F_c$ the toggle asssemblage collapses as described previously and the link 14-4 moves out of the slot 11s to contact the cam surface 12c and operate the sever lever 12.

Also indicated in FIGS. 4A and 4B is the placement of the cam 11c that provides partial release of the pawl 11p before sever.

Details of the compression cage 30 are illustrated in FIGS. 4A and 4C.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. An installation tool comprising means for gripping, tensioning and severing an item; and means connected to the tool for limiting the ejection of the severed item in the direction of tensioning, wherein the limiting means includes an ejector spring that is mounted for applying lateral pressure to said item with respect to the direction of tensioning.

2. An installation tool in accordance with claim 1 wherein the limiting means comprises means for deflecting the item thus severed in a direction that is lateral to the direction of tensioning.

3. An installation tool in accordance with claim 1 wherein the item is gripped by a pawl and the limiting means includes means for partially releasing the grip of said pawl after tension is applied to said item.

4. An installation tool in accordance with claim 1 wherein the limiting means includes a shield overlying the item to be severed.

5. An installation tool as defined in claim 1, further comprising a compression cage formed by relatively movable parts with a compression spring therein for applying force to a tensioning assemblage.

* * * * *